(12) United States Patent
Endo

(10) Patent No.: US 8,712,647 B2
(45) Date of Patent: Apr. 29, 2014

(54) STEERING LOCK DRIVING CIRCUIT AND STEERING LOCK DEVICE

(75) Inventor: Takeo Endo, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/524,594

(22) Filed: Jun. 15, 2012

(65) Prior Publication Data

US 2013/0006475 A1 Jan. 3, 2013

(30) Foreign Application Priority Data

Jun. 29, 2011 (JP) ................................. 2011-144746

(51) Int. Cl.
*B62D 6/00* (2006.01)
*B60R 25/02* (2013.01)

(52) U.S. Cl.
USPC ............................................ 701/42; 70/252

(58) Field of Classification Search
USPC ................. 701/42; 307/10.2; 70/252
See application file for complete search history.

(56) References Cited

U.S. PATENT DOCUMENTS

| 4,486,806 A * | 12/1984 | Mochida et al. ............... 361/172 |
| 4,638,882 A * | 1/1987 | Sato .............................. 180/287 |
| 6,998,731 B2 * | 2/2006 | Hayashi et al. ............... 307/10.2 |
| 7,589,433 B2 * | 9/2009 | Otani et al. .................. 307/10.2 |

FOREIGN PATENT DOCUMENTS

| JP | A-2009-274690 | 11/2009 |
| JP | 2010-264836 | * 11/2010 |
| JP | A-2010-264836 | 11/2010 |

* cited by examiner

*Primary Examiner* — Fadey Jabr
*Assistant Examiner* — Aaron L Troost
(74) *Attorney, Agent, or Firm* — Oliff PLC

(57) ABSTRACT

A steering lock driving circuit includes: a microcomputer that, based on a detected condition of a vehicle, outputs one of a lock command for restricting rotation of a steering shaft by a rock member to carry out steering lock and an unlock command for releasing the steering lock; a latch circuit that, when an unlock signal indicating that the lock member is located in an unlock position is input to the latch circuit, holds the unlock signal; an OR circuit to which a logical NOT signal of a signal output from the latch circuit and a parking signal indicating that a shift position is a parking position are input; and an AND circuit to which one of the lock command and the unlock command, a signal output from the OR circuit and a condition coincidence signal generated when information detected from the vehicle satisfies a predetermined condition are input.

13 Claims, 6 Drawing Sheets

| S | R | Q |
|---|---|---|
| 0 (LOW) | 0 (LOW) | UNCHANGED |
| 0 (LOW) | 1 (HIGH) | RESET AT 0 |
| 1 (HIGH) | 0 (LOW) | SET AT 1 |
| 1 (HIGH) | 1 (HIGH) | SET AT 1 |

STEERING LOCK DRIVING CIRCUIT AND STEERING LOCK DEVICE

INCORPORATION BY REFERENCE

The disclosure of Japanese Patent Application No. 2011-144746 filed on Jun. 29, 2011 including the specification, drawings and abstract is incorporated herein by reference in its entirety.

BACKGROUND OF THE INVENTION

1. Field of the Invention

The invention relates to a steering lock driving circuit and a steering lock device that restrict rotation of a steering shaft.

2. Description of Related Art

A vehicle is equipped with an antitheft lock mechanism that restricts (locks) rotation of a steering shaft. For example, when a passenger, or the like, rotates a steering wheel in a state where a mechanical key is removed from a key cylinder, rotation of the steering shaft is restricted. In addition, when an electronic key system in which a vehicle authenticates a key and allows engine start, or the like, is used, rotation of the steering shaft is restricted by the lock mechanism once a predetermined condition is satisfied (hereinafter, simply referred to as "steering is locked"). The latter is called electronic steering lock system.

FIG. 1 is a view that illustrates an example of a conventional electronic steering lock system. When an integrated microcomputer 230 acquires the authentication result that an electronic key is authenticated, the integrated microcomputer 230 outputs a lock power supply command from a lock power supply command port 330 to an AND circuit 430 on the condition that the ignition is off. A signal, which indicates "1" when a shift position is "P", is supplied to the AND circuit 430 via an OR circuit 410. Thus, in FIG. 1, when the ignition is off and the shift position is "P", steering is locked. It is presumable that the condition for locking steering is not satisfied while the vehicle is running, so the electronic steering lock system does not malfunction to lock steering while the vehicle is running.

In addition, a protection circuit 380 of FIG. 1 is not implemented by the software of the integrated ECU but implemented by a hardware circuit. Therefore, even when there is a malfunction in the operation of the integrated ECU (integrated microcomputer 230), the protection circuit 380 does not receive any influence, and is able to further accurately determine whether the condition for locking steering is satisfied.

In addition, when the integrated microcomputer 230 outputs an unlock signal to an OR circuit 420, steering lock is released. That is, steering lock is released even when the shift position is other than "P".

However, in the circuit shown in FIG. 1, when the integrated microcomputer 230 is being started up or when there is a malfunction in the integrated microcomputer 230, the integrated microcomputer 230, for example, may erroneously outputs the unlock signal to the OR circuit 420 and steering lock may be released.

Such erroneous release of steering lock may be prevented in a case where the condition for releasing steering lock includes a state in which the shift position signal is "P", as the condition for locking steering. However, in such a case, steering lock may not be released unless the shift position is "P".

In conventional engine start using a mechanical key, engine start is allowed even when the shift position is "N". On the other hand, in an electronic key system, steering lock is not released unless the shift position is "P", so engine start is substantially not allowed unless the shift position is "P". Therefore, some passengers may find it inconvenient.

In addition, even when a passenger tries to start the engine while setting the shift position in "P", if the passenger changes the shift position quickly after the passenger presses down an engine switch (start button) (by successive operation), the shift position may be changed to "N", or the like, other than "P", on the way of release of steering lock. In this case, because the position of a lock bar that restricts rotation of the steering shaft has not reached the unlock position yet, the passenger may have to retry engine start.

SUMMARY OF THE INVENTION

The invention provides a steering lock driving circuit and a steering lock device that allow release of steering lock irrespective of a shift position, without unintended steering lock or release of steering lock due to a malfunction in a microcomputer.

A first aspect of the invention relates to a steering lock driving circuit. The steering lock driving circuit includes: a microcomputer that, on the basis of a detected condition of a vehicle, outputs one of a lock command for restricting rotation of a steering shaft to carry out steering lock and an unlock command for releasing the steering lock; a latch circuit that, when an unlock signal indicating that a lock member is located in an unlock position at which the steering lock is released is input to the latch circuit, holds the unlock signal, wherein the lock member restricts rotation of the steering shaft when the rock member is located in a lock position; an OR circuit to which a logical NOT signal of a signal output from the latch circuit and a parking signal indicating that a shift position is a parking position are input; and an AND circuit to which one of the lock command and the unlock command, an OR signal output from the OR circuit and a condition coincidence signal generated when information detected from the vehicle satisfies a predetermined condition are input.

The AND circuit may output a drive permission signal when the one of the lock command and the unlock command, the OR signal and the condition coincidence signal are input to the AND circuit, and the steering lock may be carried out or the steering lock may be released on the basis of the drive permission signal.

The unlock signal may be input to the latch circuit from an unlock sensor that detects that the lock member is located in the unlock position.

When a reset signal output from the microcomputer is input to the latch circuit together with a lock signal indicating that the lock member is located in the lock position, the latch circuit may hold the lock signal.

The lock signal may be input to the latch circuit from a lock sensor that detects that the lock member is located in the lock position.

When the reset signal is input to the latch circuit together with the unlock signal, the latch circuit may continue to hold the unlock signal.

The condition coincidence signal may be input to the AND circuit when a speed of the vehicle is substantially zero.

A second aspect of the invention relates to a steering lock device. The steering lock device includes: a microcomputer that, on the basis of a detected condition of a vehicle, outputs one of a lock command for restricting rotation of a steering shaft to carry out steering lock and an unlock command for releasing the steering lock; an unlock sensor that detects that a lock member is located in an unlock position at which the steering lock is released, wherein the lock member restricts rotation of the steering shaft when the rock member is located in a lock position; a latch circuit that, when an unlock signal indicating that the lock member is located in the unlock position is input from the unlock sensor to the latch circuit, holds the unlock signal; an OR circuit to which a logical NOT signal of a signal output from the latch circuit and a parking signal indicating that a shift position is a parking position are input; an AND circuit to which one of the lock command and the unlock command, an OR signal output from the OR circuit and a condition coincidence signal generated when information detected from the vehicle satisfies a predetermined condition are input; a motor that drives the lock member; a motor driving circuit that outputs current to the motor on the basis of a drive permission signal output from the AND circuit; and a motor control unit that controls rotation of the motor.

The AND circuit may output the drive permission signal when the one of the lock command and the unlock command, the OR signal and the condition coincidence signal are input to the AND circuit.

When a reset signal output from the microcomputer is input to the latch circuit together with a lock signal indicating that the lock member is located in the lock position, the latch circuit may hold the lock signal.

The steering lock device according may further includes a lock sensor that detects that the lock member is located in the lock position, wherein the lock signal may be input to the latch circuit from the lock sensor.

When the reset signal is input to the latch circuit together with the unlock signal, the latch circuit may continue to hold the unlock signal.

The condition coincidence signal may be input to the AND circuit when a speed of the vehicle is substantially zero.

With the above configurations, it is possible to release steering lock irrespective of a shift position, without unintended steering lock or release of steering lock due to a malfunction in a microcomputer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
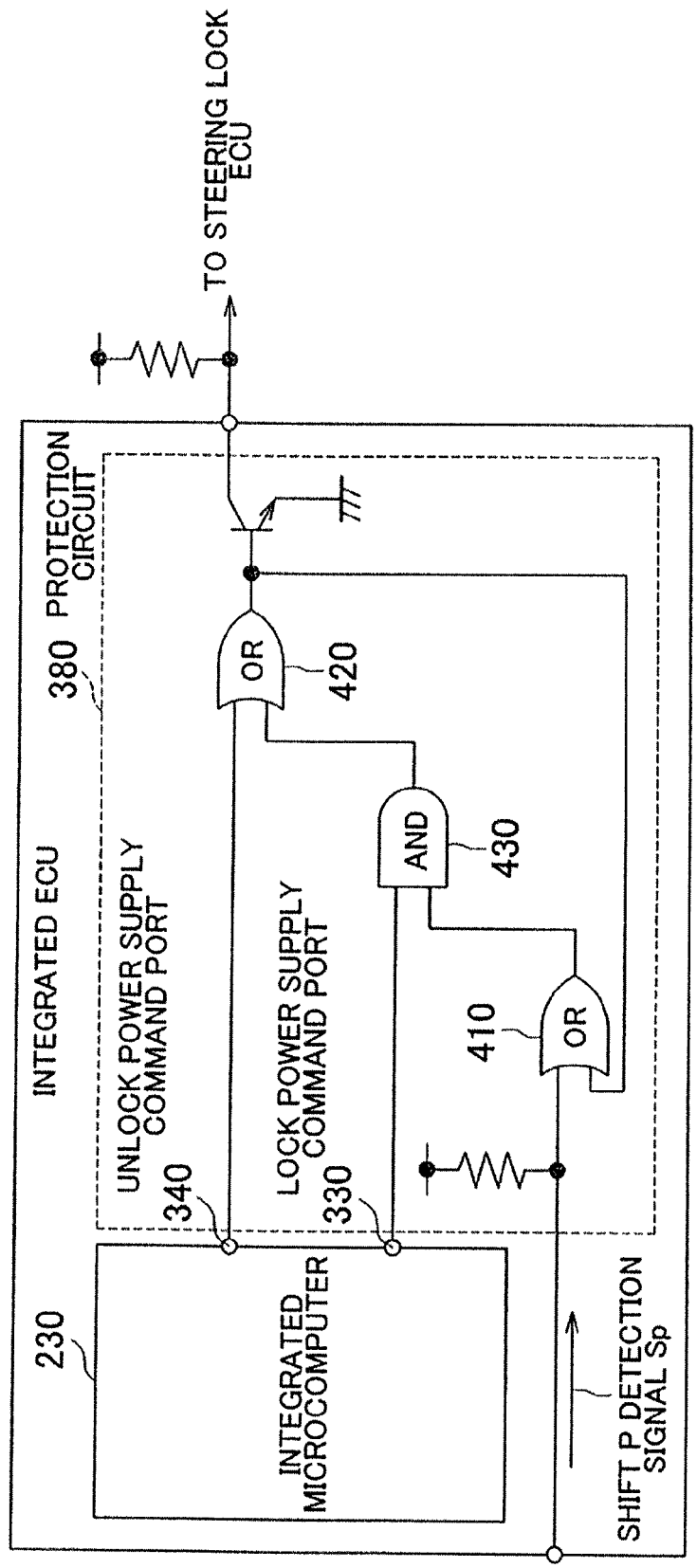
FIG. 1 is a view that illustrates an example of a conventional electronic steering lock system.
Figure 2:
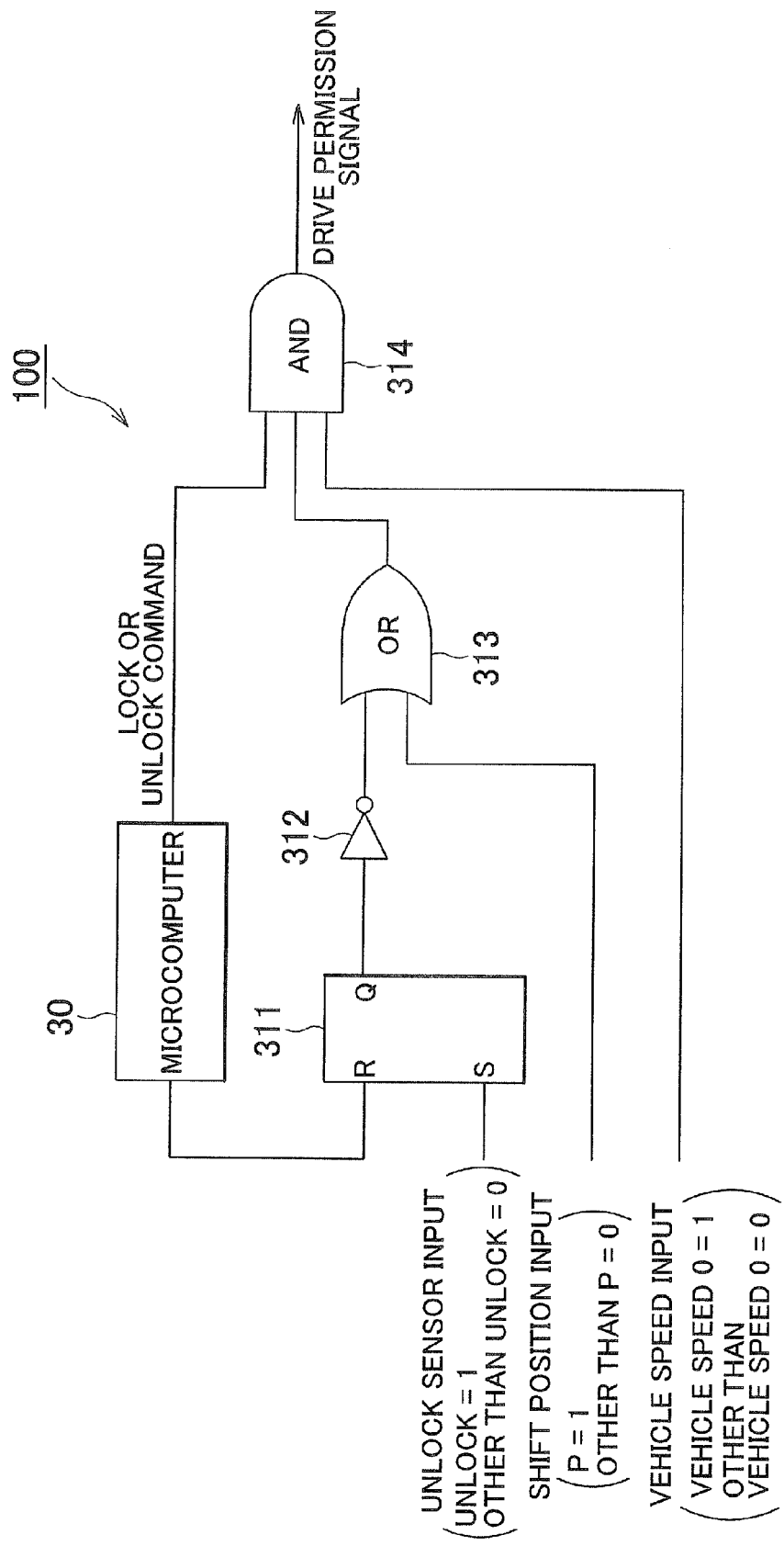
FIG. 2 is a view that illustrates part of a steering lock device according to an embodiment.

Hereinafter, an embodiment of the invention will be described with reference to the accompanying drawings. FIG. 2 is a view that illustrates part of a push-start control ECU 100 according to the present embodiment. As shown in the drawing, when the following three conditions are satisfied, the push-start control ECU 100 outputs a drive permission signal to restrict rotation of a steering shaft for steering lock or to release the steering lock. Steering is locked when a lock bar is located in a lock position, and steering lock is released when the steering lock bar is located in an unlock position.

(1) A lock command or an unlock command is output from a microcomputer.
(2) a shift position is "P (parking)" or steering is in a state other than an unlocked state in which steering lock is released.
(3) A vehicle speed is zero (substantially zero).

When the vehicle is running, the lock bar should be located in the unlock position. Therefore, an unlock sensor outputs a signal indicating the unlocked state of steering (i.e., a signal indicating "1"). A latch circuit 311 holds a set state or a reset state, so the latch circuit 311 holds the signal indicating the unlocked state of steering (i.e., the signal indicating "1"). The output of the latch circuit 311 is inverted by a NOT circuit 312 to become a signal indicating "0", so the signal indicating "0" is input from the latch circuit 311 to an OR circuit 313. A signal detected by a shift position sensor is input to the OR circuit 313. However, the shift position extremely rarely becomes "P" while the vehicle is running. Thus, when the vehicle is running, an AND circuit 314 does not output the drive permission signal. In addition, even if a malfunction occurs in the microcomputer, erroneous steering lock may be prevented on the basis of the shift position and the vehicle speed while the vehicle is running.

In addition, even when steering enters a state other than the unlocked state because of vibrations, or the like, the latch circuit 311 holds the signal indicating "1". Therefore, even when the lock bar moves to the lock position while the vehicle is running, there is no possibility that the latch circuit 311 outputs a signal indicating "0".

While the vehicle is parked, steering is locked and the unlock sensor does not detect the unlocked state of steering. That is, the latch circuit 311 holds a signal indicating "0". The output of the latch circuit 311 is inverted by the NOT circuit 312 to become a signal indicating "1", so the signal indicating "1" is input from the latch circuit 311 to the OR circuit 313. Here, it is assumed that, when a passenger (including a driver) carries out unlock operation of steering (engine start operation), the shift position is not set in "P". In this case, a signal indicating "0" is input to the OR circuit 313 as the signal detected by the shift position sensor; however, a signal indicating "1" is input from the NOT circuit 312, so the OR circuit 313 outputs the signal indicating "1" to the AND circuit 314. Therefore, when the microcomputer 30 outputs the unlock command and the vehicle speed is zero, steering lock is released (the engine is started) irrespective of the shift position.

Thus, in the push-start control ECU 100 according to the present embodiment, the latch circuit 311 holds the result detected by the unlock sensor to thereby further reliably prevent erroneous steering lock during vehicle running due to a malfunction, or the like, of the microcomputer 30, and to allow release of steering lock when the shift position is other than "P".

Figure 3:
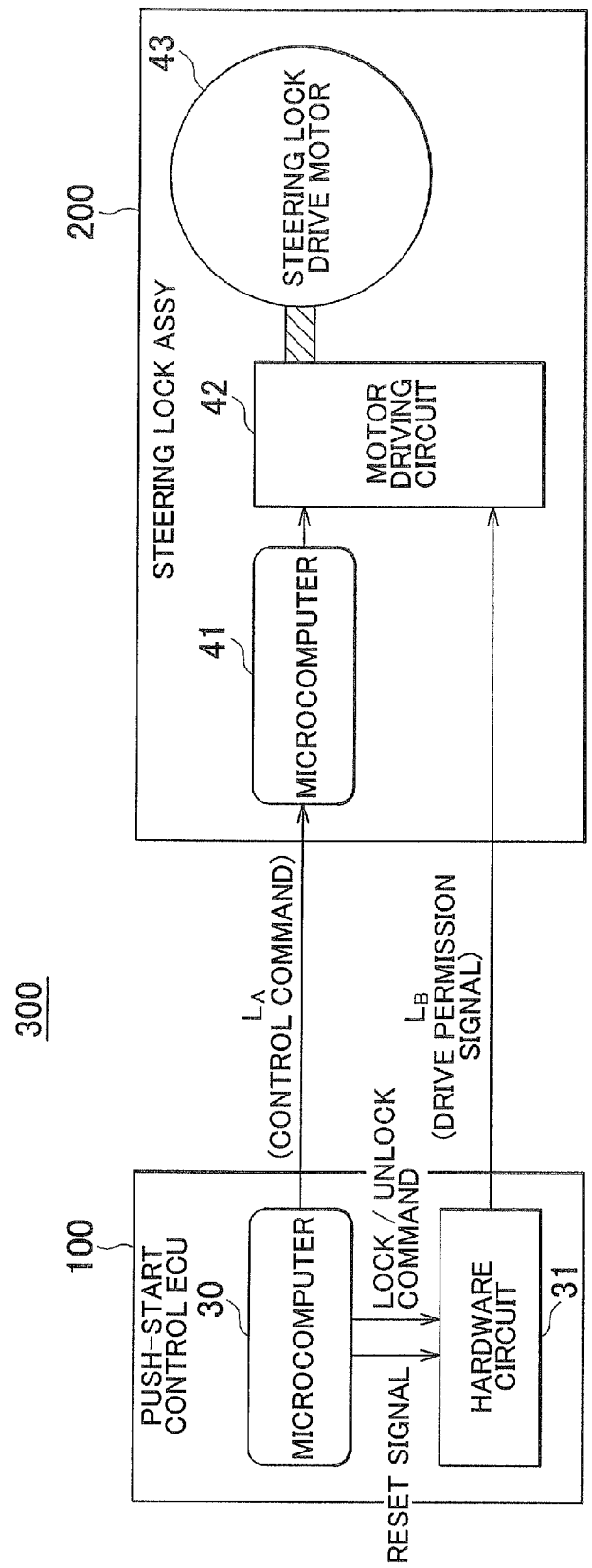
FIG. 3 is a schematic configuration view of the steering lock device.

FIG. 3 shows a schematic configuration view of a steering lock device 300 according to the present embodiment. The steering lock device 300 includes the push-start control ECU 100 and a steering lock ASSY 200. The microcomputers 30 and 41 of both the push-start control ECU 100 and the steering lock ASSY 200 are connected to each other via an in-vehicle network, such as a local interconnect network (LIN) and a controller area network (CAN). A hardware circuit 31 of the push-start control ECU 100 and a motor driving circuit 42 of the steering lock ASSY 200 are directly connected to each other.

The push-start control ECU 100 includes the microcomputer 30 and the hardware circuit 31. The microcomputer 30 is a computer in which a CPU, a RAM, a ROM, a CAN controller (CANC), an I/O port, and the like, are connected to one another via a bus. In the microcomputer 30, the CPU executes programs stored in the ROM to determine whether to output a control command, a reset signal and a lock command/unlock command.

The microcomputer 30 of the push-start control ECU 100 transmits the control command to the microcomputer 41 of the steering lock ASSY 200 via a line $L_A$. The control command includes a forward rotation command for locking steering, a reverse rotation command for releasing steering lock, a stop command for stopping locking steering or releasing steering lock, and the like. In addition, the microcomputer 41 of the steering lock ASSY 200 provides operation information to the microcomputer 30 of the push-start control ECU 100 via the line $L_A$. The operation information includes completion of lock of steering, completion of release of steering lock, completion of stop locking steering or releasing steering lock, or the like.

In addition, the push-start control ECU 100 outputs the drive permission signal to the steering lock ASSY 200 via a line $L_B$. The push-start control ECU 100 outputs the drive permission signal to the steering lock ASSY 200 not only when steering is locked but also when steering lock is released. The control command transmitted via the line $L_A$ controls whether to lock steering or to release steering lock.

The hardware circuit 31 determines whether the condition for outputting the drive permission signal is satisfied, and then outputs the drive permission signal. The microcomputer 30 and the hardware circuit 31 may use the same condition in determination as to whether to output the lock command or the unlock command and determination as to whether to output the drive permission signal or may use totally different conditions in those determinations.

The steering lock ASSY 200 includes the microcomputer 41, the motor driving circuit 42 and a steering lock drive motor (hereinafter, simply referred to as drive motor) 43. The microcomputer 41 is a computer in which a CPU, a RAM, a ROM, a CANC, an I/O port, and the like, are connected to one another via a bus. The microcomputer 41 controls the rotation, stop and rotation direction operation of the motor driving circuit 42 on the basis of a control command from the microcomputer 30.

When the microcomputer 41 receives the forward rotation command from the microcomputer 30, the microcomputer 41 controls the rotation direction of the drive motor 43 so as to lock steering (rotate in the forward direction). When the microcomputer 41 receives the reverse rotation command from the microcomputer 30, the microcomputer 41 controls the rotation direction of the drive motor 43 so as to release steering lock (rotate in the reverse direction). When the motor driving circuit 42 receives the drive permission signal, the motor driving circuit 42 generates drive current and supplies the generated drive current to the drive motor 43. The drive motor 43 is, for example, a DC motor.

Figure 4:
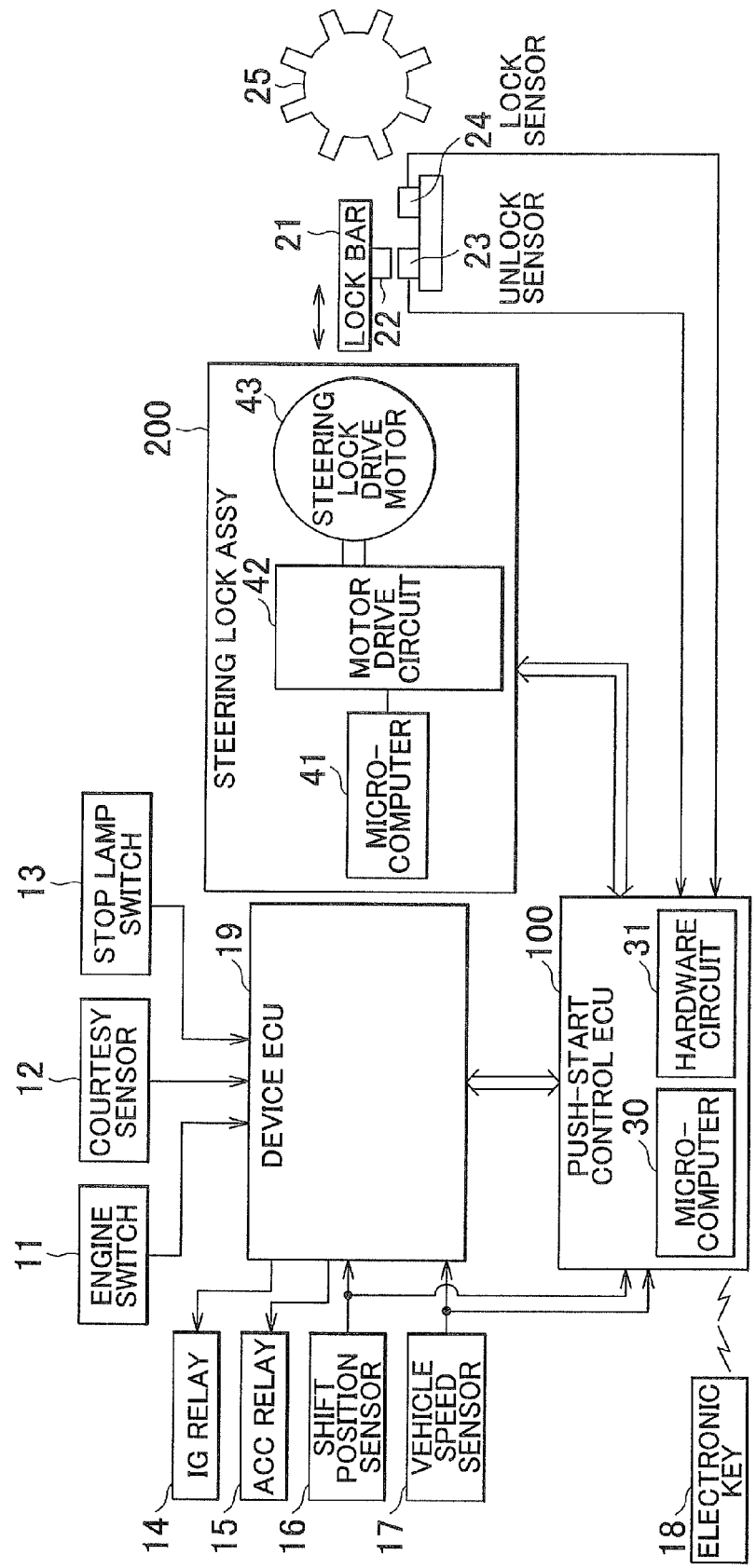
FIG. 4 is a view that illustrates the system configuration of the steering lock device.

FIG. 4 is a view that illustrates the system configuration of the steering lock device 300. First, an engine switch 11, a courtesy sensor 12, a stop lamp switch 13, a shift position sensor 16, an IG relay 14, an ACC relay 15, a vehicle speed sensor 17 and the push-start control ECU 100 are connected to a device ECU 19.

The engine switch 11 is a push-button momentary switch. Inside the engine switch 11, urging force is applied to the engine switch 11 by an elastic element toward an initial position. That is, the engine switch 11 outputs an on signal only when the engine switch 11 is being pressed by the driver. The courtesy sensor 12 detects open/close of a door, and is arranged door by door. The stop lamp switch 13 turns on when a brake pedal is depressed.

The ACC relay 15 turns on or off power supplied from a battery to accessory devices (audio devices, a navigation system, an interior lamp, and the like). The IG relay 14 turns on or off power supplied from the battery to devices (meters, a wiper, an ignition coil, an injector, and the like) required while the vehicle is finning. The shift position sensor 16 detects the position (shift position) of the shift lever, and outputs an electric signal corresponding to the detected shift position. The vehicle speed sensor 17, for example, outputs a pulse signal in synchronization with rotation of wheels. Each ECU is able to obtain the vehicle speed from the number of pulses per unit time.

The push-start control ECU 100 is connected to an indoor antenna (not shown) and an outdoor antenna (not shown), and communicates with an electronic key 18. In a door locked state, the push-start control ECU 100 uses the outdoor antenna to form the detection area of the electronic key 18 outside the vehicle. The detection area has a range in which request radio waves reach from the outdoor antenna. In addition, the push-start control ECU 100 uses the indoor antenna to form the detection area of the electronic key 18 inside the vehicle in a predetermined situation, that is, for example, when a driver-side door is opened or closed, when the brake pedal is depressed, or when the engine switch 11 is turned on.

The push-start control ECU 100 transmits request radio waves for an ID code to the electronic key 18 within the detection area. The electronic key 18 carried by the driver transmits response radio waves that include the ID code. The push-start control ECU 100 receives response radio waves by a tuner, and authenticates the electronic key 18 on the basis of whether the received ID code coincides with a prestored ID code.

The device ECU 19 manages engine start and engine stop on the basis of the authentication result of the electronic key 18, and the like. Steering is locked, for example, in the middle of a series of steps of engine start, and steering lock is released, for example, in the middle of a series of steps of engine stop. The steps of locking steering and releasing steering lock will be described later.

The drive motor 43 drives a lock bar 21 in the direction to approach the steering shaft 25 or in the direction to move away from the steering shaft 25. For example, a permanent magnet 22 is fixed to the lock bar 21 for position detection. An unlock sensor 23 and a lock sensor 24 are fixed at a location facing the lock bar 21 (for example, on the substrate of the steering lock ASSY 200). Each of the unlock sensor 23 and the lock sensor 24 has, for example, a Hall element, and detects a magnetic flux density that varies depending on the position of the permanent magnet 22. Thus, the unlock sensor 23 detects that the lock bar 21 is located in the unlock position (steering is in an unlocked state), and the lock sensor 24 detects that the lock bar 21 is located in the lock position (steering is in a locked state). Instead of the unlock sensor 23 and the lock sensor 24, a single sensor may be provided to detect that the lock bar 21 is located in the unlock position and that the lock bar 21 is located in the lock position.

The unlock sensor 23 and the lock sensor 24 are connected to the push-start control ECU 100. The push-start control ECU 100 is able to detect that the lock bar 21 is located in the unlock position or the lock bar 21 is located in the lock position.

When the steering lock ASSY 200 rotates the drive motor 43 in the forward direction on the basis of the drive permission signal, the lock bar 21 moves in the direction to approach the steering shaft 25. The steering shaft 25 has a plurality of recesses on the circumference of the shaft. As the lock bar 21 approaches, the distal end of the lock bar 21 engages with any one of the recesses. Steering enters into a locked state where the lock bar 21 restricts rotation of the steering shaft 25 by engaging with any one of the recesses. When the steering lock ASSY 200 detects that the lock bar 21 has moved to the lock position on the basis of the output of the lock sensor 24, the steering lock ASSY 200 stops the drive motor 43.

Similarly, when the steering lock ASSY 200 rotates the drive motor 43 in the reverse direction on the basis of the drive permission signal, the lock bar 21 moves in the direction to move away from the steering shaft 25. By so doing, steering enters into an unlocked state where engagement between the distal end of the lock bar 21 with any one of the recesses is released and therefore the lock bar 21 does not restrict rotation of the steering shaft 25. When the steering lock ASSY 200 detects that the lock bar 21 has moved to the unlock position on the basis of the output of the unlock sensor 23, the steering lock ASSY 200 stops the drive motor 43.

An example of a situation in which steering is locked may be the case where a passenger stops the engine and then gets off the vehicle. Steps of locking steering will be described below.

(A1) After the vehicle stops (the vehicle speed is zero), the passenger sets the shift position in, for example, "P" and presses down the engine switch 11.

(A2) The device ECU 19 detects the shift position="P" on the basis of the output of the shift position sensor 16, detects that the vehicle speed is zero on the basis of the output of the vehicle speed sensor 17, and then determines that the engine is allowed to be stopped. Then, the device ECU 19 turns off the IG relay 14 and the ACC relay 15. By so doing, the engine stops.

(A3) The push-start control ECU 100 detects that the IG relay 14 and the ACC relay 15 are turned off. Irrespective of the off states of the IG relay 14 and the ACC relay 15 are turned off, electric power is supplied from the battery to the push-start control ECU 100.

(A4) When the driver opens the door, the courtesy sensor 12 detects that the door is opened.

(A5) The push-start control ECU 100 acquires the result detected by the courtesy sensor 12 that the door is opened via the device ECU 19. On the basis of the above detected result and the power-off detected in (A3) (the off states of the IG relay 14 and the ACC relay 15 are turned off), the microcomputer 30 of the push-start control ECU 100 determines that steering should be locked. The microcomputer 30 outputs the forward rotation command to the microcomputer 41 of the steering lock ASSY 200, and outputs the lock command to the AND circuit 314 (described later).

The lock command output in (A5) corresponds to the lock command output from the microcomputer 30 in the above described condition (1). Thus, the push-start control ECU 100 outputs the drive permission signal to the steering lock ASSY 200 on the basis of the result determined by the hardware circuit 31 as to whether the remaining conditions (2) and (3) are satisfied.

(A6) The steering lock ASSY 200 rotates the drive motor 43 in the forward direction to thereby lock steering. The steering lock ASSY 200 provides information about completion of steering lock to the push-start control ECU 100.

An example of a situation that steering lock is released may be the case where the passenger gets on the vehicle and then presses down the engine switch 11. When the engine switch 11 is pressed down, the engine starts if the passenger depresses the brake pedal; whereas, a power status shifts (from power-off to ACC-on mode or IG-on mode (the engine does not start)) if the passenger does not depress the brake pedal. In any cases, steering lock is released. Here, the steps of releasing steering lock will be described by taking the case of engine start as an example.

(B1) The passenger (driver) gets on the vehicle while carrying the electronic key 18.

(B2) When the driver starts the engine, as the driver depresses the brake pedal, the device ECU 19 detects depression of the brake pedal.

(B3) The device ECU 19 requests the push-start control ECU 100 of verification of the electronic key 18 in response to depression of the brake pedal.

(B4) The push-start control ECU 100 uses the indoor antenna to form the detection area including the driver seat (transmits request radio waves).

(B5) The electronic key 18 carried by the driver transmits response radio waves to the tuner.

(B6) When the ID included in the response radio waves is authenticated, the push-start control ECU 100 provides information about successful authentication to the device ECU 19.

(B7) The driver sets the shift position in "P" (or "N") and presses down the engine switch 11 in order to start the engine. The device ECU 19 detects that the engine switch is pressed down.

(B8) When the device ECU 19 detects that the engine start condition (the engine switch is turned on, the shift position is "P" (or "N"), the brake pedal is depressed, and authentication is successful) is satisfied, the device ECU 19 sequentially turns on the ACC relay 15 and the IG relay 14.

(B9) The microcomputer 30 of the push-start control ECU 100 detects that the power mode shifts into the IG-ON mode, outputs the reverse rotation command to the microcomputer 41 of the steering lock ASSY 200, and outputs the unlock command to the AND circuit 314 (described later).

The unlock command in (B9) corresponds to the unlock command output from the microcomputer 30 in the above described condition (1). Thus, the push-start control ECU 100 outputs the drive permission signal to the steering lock ASSY 200 on the basis of the result determined by the hardware circuit 31 as to whether the remaining conditions (2) and (3) are satisfied.

(B10) The steering lock ASSY 200 rotates the drive motor 43 in the reverse direction to thereby release steering lock. The steering lock ASSY 200 provides information about completion of release of steering lock to the push-start control ECU 100.

(B11) The device ECU acquires information about completion of release of steering lock from the push-start control ECU 100, and requests the engine ECU to start the engine.

(B12) The engine ECU turns on a starter relay to start the engine. The device ECU 19 acquires an engine rotation speed or engine start information from the engine ECU to thereby detect start of the engine.

The above described steps represents an engine start method for a vehicle that uses only an internal combustion engine to generate driving force of the vehicle. In a vehicle (EV) that uses an electric motor to generate power or a vehicle (HV) that uses an electric motor to generate part of power as well, steps of releasing steering lock are substantially the same.

Figure 5:
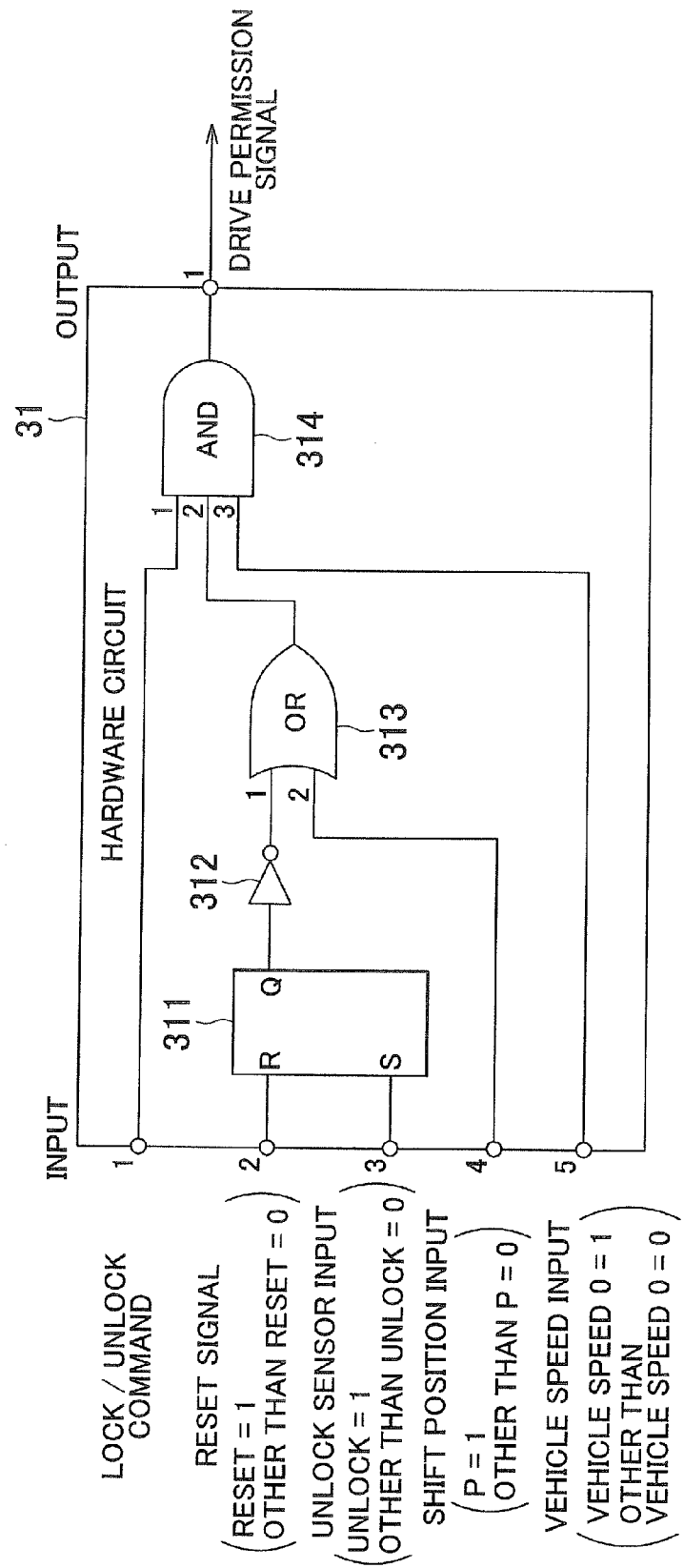
FIG. 5 is a configuration view of a hardware circuit.

FIG. 5 is a configuration view of the hardware circuit 31. The hardware circuit 31 has five input ports. The microcomputer 30 is connected to the input ports 1 and 2. The unlock sensor 23 is connected to the input port 3. The shift position sensor 16 is connected to the input port 4. The vehicle speed sensor 17 is connected to the input port 5. In addition, the hardware circuit 31 has one output port. The output port is connected to the motor driving circuit 42. Not the result detected by the vehicle speed sensor 17 but information, such as a variation in vehicle position, may be input to the input port 5. In addition, an additional input port is provided, and information from the additional input port is also supplied to the AND circuit 314 to thereby make it possible to tighten the condition for outputting the drive permission signal. Further, the lock sensor 24 may be connected to the additional input port. In this case, the result detected by the lock sensor 24 may be input to the hardware circuit 31 in addition to the result detected by the unlock sensor 24.

The input port 1 is connected to the first input terminal of the AND circuit 314. The input port 2 is connected to the R terminal of the latch circuit 311. The input port 3 is connected to the S terminal of the latch circuit 311. The input port 4 is connected to the second input terminal of the OR circuit 313. The input port 5 is connected to the third input terminal of AND circuit 314.

The lock command (active high signal) or the unlock command (active high signal) is input to the input port 1. The reset signal (active high signal) is input to the input port 2. The signal detected by the unlock sensor 23 is input to the input port 3. The signal detected by the shift position sensor 16 is input to the input port 4. The vehicle speed is input to the input port 5. The input port 3 generates a high signal when the signal detected by the unlock sensor 23 indicates the unlocked state of steering, and generates a low signal when the detected signal indicates a state other than the unlocked state. The input port 4 generates a high signal when the signal detected by the shift position sensor 16 indicates "P" (parking), and generates a low signal when the detected signal indicates a shift position other than "P". The input port 5 generates a high signal when the vehicle speed is zero, and generates a low signal when the vehicle speed is not zero.

Figures 6, 7:
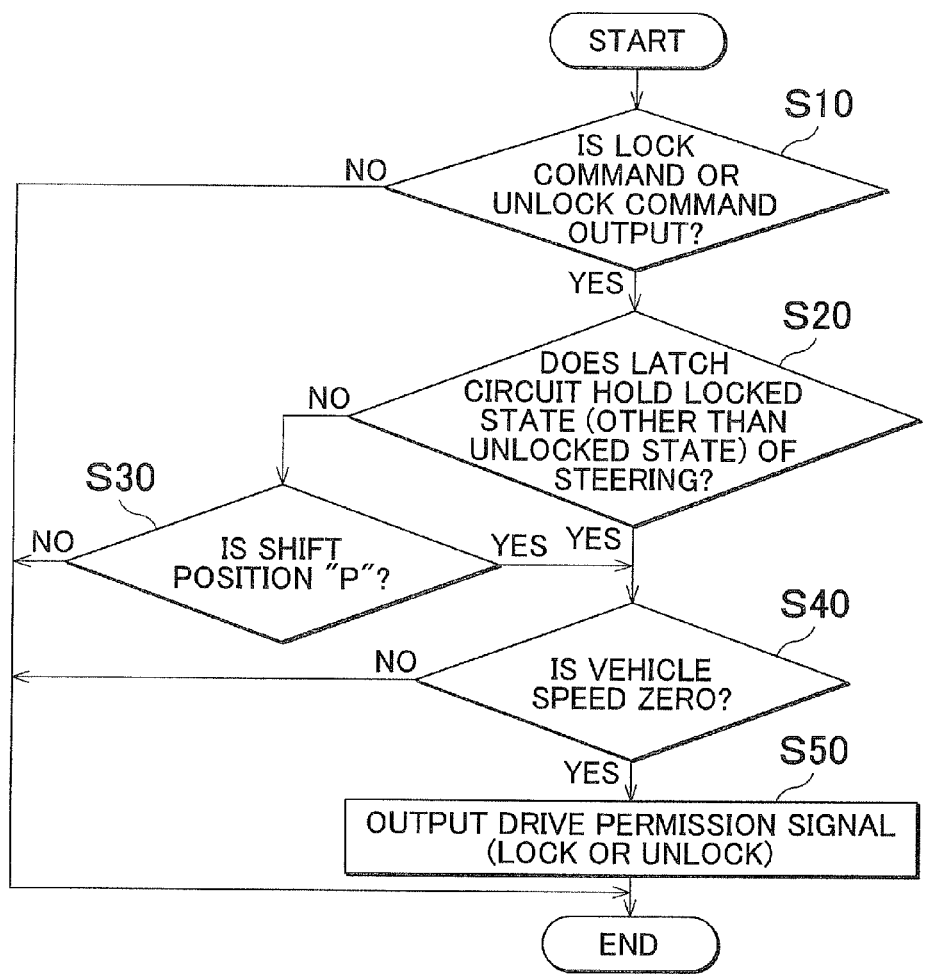
FIG. 6 is a table that shows the relationship among an input of an S terminal, an input of an R terminal and an output from a Q terminal.
FIG. 7 is a flow chart that illustrates a condition on which a drive permission signal is output.

The latch circuit 311 is a so-called RS flip-flop. The RS flip-flop varies a state held inside on the basis of a combination of an input (high or low signal) of the S terminal and an input (high or low signal) of the R terminal. A signal that indicates the state held inside is output from an output terminal Q. FIG. 6 is an example of a table that shows the relationship among inputs of the S terminal and R terminal and an output from the Q terminal. When a low signal is input to the S terminal and a low signal is input to the R terminal, the held information remains unchanged. As shown in the table, when a low signal is input to the S terminal and a high signal is input to the R terminal, the held state is reset to a low state; whereas, when a high signal is input to the S terminal and a low signal is input to the R terminal, the held state is set to a high state. The held state in the case where a high signal is input to the S terminal and a high signal is input to the R terminal will be described later.

Here, the microcomputer 30 temporarily outputs the reset signal only when the lock sensor 24 has detected the locked state of steering. At this time, the lock bar 21 is located in the lock position, and the unlock sensor 23 does not detect the unlocked state of steering, so a low signal is input to the S terminal. Thus, when the steering shaft 25 is locked, the latch circuit 311 is reset to be in a low state, and holds the low state.

In addition, when the unlock sensor 23 detects the unlocked state of steering, the unlock sensor 23 outputs a high signal, so the high signal is input to the S terminal. At this time, the microcomputer 30 does not output the reset signal, so a low signal is input to the R terminal. Thus, when steering lock is released, the latch circuit 311 is set to be in a high state, and holds the high state. In this way, the latch circuit 311 holds whether steering is in the locked state (low state) or in the unlocked state (high state).

Generally, a state in which high signals are input to both the S terminal and R terminal is forbidden; however, in the present embodiment, when high signals are input to both the S terminal and R terminal, the latch circuit 311 is set to be in a high state, and holds the high state. By so doing, even when a malfunction occurs in the microcomputer 30 and then the microcomputer 30 continuously outputs the reset signal, the latch circuit 311 is able to hold a high state (that is, the unlocked state of steering).

Once the latch circuit 311 stores the unlocked state of steering, the latch circuit 311 does not store the locked state of steering unless the microcomputer 30 outputs the reset signal. Therefore, even when the state other than the unlocked state of steering is detected, the output of the Q terminal does not become a low signal.

Because the Q terminal of the latch circuit 311 is connected to the NOT circuit 312, when the latch circuit 311 holds the unlocked state of steering, a low signal is input to the first input terminal of the OR circuit 313; whereas, when the latch circuit 311 holds the locked state of steering, a high signal is input to the first input terminal of the OR circuit 313.

Only when the shift position is "P", a high signal is input to the second input terminal of the OR circuit 313. Therefore, considering that the shift position is almost not set in "P" while the vehicle is running, the OR circuit 313 does not output a high signal while the latch circuit 311 is holding the unlocked state of steering after the vehicle starts running.

The output of the OR circuit 313 is input to the second input terminal of the AND circuit 314. Only when the vehicle speed is zero, a high signal is input to the third input terminal of the AND circuit 314. As described above, the lock command or the unlock command is input to the first input terminal.

According to the thus configured hardware circuit 31, unless the three conditions, that is, (1) the microcomputer 30 outputs the lock command or the unlock command, (2) a shift position is "P" or steering is in a state other than the unlocked state of steering, and (3) the vehicle speed is zero, are satisfied, the hardware circuit 31 does not output the drive permission signal.

FIG. 7 is a flow chart that illustrates a condition on which the drive permission signal is output from the hardware circuit 31. Initially, it is determined whether the lock command or the unlock command is output from the microcomputer 30 (S10). When the microcomputer 30 outputs the lock command or the unlock command (Yes in S10), it is determined whether the latch circuit 311 holds the locked state of steering (S20). At this time, when the latch circuit 311 holds the locked state of steering (Yes in S20), it is determined whether the vehicle speed is zero (S40). When the vehicle speed is zero (Yes in S40), the hardware circuit 31 outputs the drive permission signal to the motor driving circuit 42 (S50).

When the latch circuit 311 does not hold the locked state of steering in S20 (No in S20), it is determined whether the shift position is "P" (S30). When the shift position is "P" (Yes in S30), and when the vehicle speed is zero (Yes in S40), the hardware circuit 31 outputs the drive permission signal to the motor driving circuit 42 (S50).

While the vehicle is running, the latch circuit 311 holds the unlocked state of steering. Therefore, owing to the condition that the shift position is "P" and the condition that the vehicle speed is zero, even if there occurs a malfunction in the microcomputer 30, erroneous steering lock may be prevented.

In addition, while the vehicle is running, when there occurs a situation that the lock bar 21 deviates from the unlock side toward the lock side because of vibrations (even when the lock bar 21 does not reach the lock position), the unlock sensor 23 inputs a low signal to the S terminal. However, only by that, the microcomputer 30 does not output the reset signal, so the latch circuit 311 remains holding the unlocked state of steering. Thus, while the vehicle is running, even if the unlock sensor 23 receives the influence of vibrations of the lock bar 21, erroneous steering lock may be prevented.

In other words, while the vehicle is running, the latch circuit 311 holds the unlocked state of steering unless there occurs a malfunction in the microcomputer 30, the microcomputer 30 therefore continuously outputs the reset signal and the lock bar 21 deviates from the unlock side toward the lock side. In case this situation occurs, unless the vehicle speed is zero and the microcomputer 30 outputs the lock command, erroneous steering lock may be prevented. On the other hand, when the passenger presses down the engine switch and steering is locked while the vehicle is parked, the latch circuit 311 holds the locked state of steering. Therefore, the NOT circuit 312 outputs a high signal, so the OR circuit 313 outputs a high signal irrespective of the shift position. Thus, the driver is able to release steering lock even when the shift position is "N" (whether the engine may be started depends on the specifications of the vehicle; however, at least it is not influenced by the condition for releasing steering lock).

Therefore, for example, after the shift position is set in "P" and the passenger presses down the engine switch 11, the passenger changes the shift position to "N" (other than "P") in a short time, until the unlock sensor 23 detects the unlocked state of steering, the latch circuit 311 outputs a low signal (the NOT circuit 312 outputs a high signal). The OR circuit 313 invalidates the state of the shift position and outputs a high signal to the AND circuit 314, so the lock bar 21 does not stop before reaching the unlock position.

As described above, with the steering lock device 300 according to the present embodiment, the latch circuit 311 stores the unlocked state of steering to thereby prevent unintended lock or unlock of steering due to a malfunction in the microcomputer 30. In addition, it is possible to release steering lock irrespective of the shift position.

What is claimed is:

1. A steering lock driving circuit comprising:
  a microcomputer that, on the basis of a detected condition of a vehicle, outputs one of a lock command for restricting rotation of a steering shaft to carry out steering lock and an unlock command for releasing the steering lock;
  a latch circuit that, when an unlock signal indicating that a lock member is located in an unlock position at which the steering lock is released is input to the latch circuit, holds the unlock signal, wherein the lock member restricts rotation of the steering shaft when the lock member is located in a lock position;
  an OR circuit to which a logical NOT signal of a signal output from the latch circuit and a parking signal indicating that a shift position is a parking position are input;
  an AND circuit to which one of the lock command and the unlock command, an OR signal output from the OR circuit and a condition coincidence signal generated when information detected from the vehicle satisfies a predetermined condition are input; and
  a NOT circuit that inverts the signal output from the latch circuit and outputs the inverted signal to the OR circuit as the logical NOT signal of the signal output from the latch circuit.

2. The steering lock driving circuit according to claim 1, wherein
  the AND circuit outputs a drive permission signal when the one of the lock command and the unlock command, the OR signal and the condition coincidence signal are input to the AND circuit; and
  the steering lock is carried out or the steering lock is released on the basis of the drive permission signal.

3. The steering lock driving circuit according to claim 1, wherein
  the unlock signal is input to the latch circuit from an unlock sensor that detects that the lock member is located in the unlock position.

4. The steering lock driving circuit according to claim 1, wherein
  when a reset signal output from the microcomputer is input to the latch circuit together with a lock signal indicating that the lock member is located in the lock position, the latch circuit holds the lock signal.

5. The steering lock driving circuit according to claim 4, wherein
  the lock signal is input to the latch circuit from a lock sensor that detects that the lock member is located in the lock position.

6. The steering lock driving circuit according to claim 4, wherein
  when the reset signal is input to the latch circuit together with the unlock signal, the latch circuit continues to hold the unlock signal.

7. The steering lock driving circuit according to claim 1, wherein
  the condition coincidence signal is input to the AND circuit when a speed of the vehicle is substantially zero.

8. A steering lock device comprising:
  a microcomputer that, on the basis of a detected condition of a vehicle, outputs
  one of a lock command for restricting rotation of a steering shaft to carry out steering lock and an unlock command for releasing the steering lock;
  an unlock sensor that detects that a lock member is located in an unlock position at which the steering lock is released, wherein the lock member restricts rotation of the steering shaft when the lock member is located in a lock position;
  a latch circuit that, when an unlock signal indicating that the lock member is located in the unlock position is input from the unlock sensor to the latch circuit, holds the unlock signal;
  an OR circuit to which a logical NOT signal of a signal output from the latch circuit and a parking signal indicating that a shift position is a parking position are input;
  an AND circuit to which one of the lock command and the unlock command, an OR signal output from the OR circuit and a condition coincidence signal generated when information detected from the vehicle satisfies a predetermined condition are input;

a NOT circuit that inverts the signal output from the latch circuit and outputs the inverted signal to the OR circuit as the logical NOT signal of the signal output from the latch circuit;

a motor that drives the lock member;

a motor driving circuit that outputs current to the motor on the basis of a drive permission signal output from the AND circuit; and a motor control unit that controls rotation of the motor.

9. The steering lock driving circuit according to claim 8, wherein the AND circuit outputs the drive permission signal when the one of the lock command and the unlock command, the OR signal and the condition coincidence signal are input to the AND circuit.

10. The steering lock device according to claim 8, wherein when a reset signal output from the microcomputer is input to the latch circuit together with a lock signal indicating that the lock member is located in the lock position, the latch circuit holds the lock signal.

11. The steering lock device according to claim 10, further comprising a lock sensor that detects that the lock member is located in the lock position, wherein the lock signal is input to the latch circuit from the lock sensor.

12. The steering lock device according to claim 10, wherein when the reset signal is input to the latch circuit together with the unlock signal, the latch circuit continues to hold the unlock signal.

13. The steering lock device according to claim 8, wherein the condition coincidence signal is input to the AND circuit when a speed of the vehicle is substantially zero.

\* \* \* \* \*